No. 695,056. Patented Mar. 11, 1902.
W. W. JAQUES.
TRACE HOOK.
(Application filed Dec. 4, 1901.)

(No Model.)

Witnesses
T. P. Britt
Harry Ellis Chandler

Inventor
W. W. Jaques,
by Chandler & Chandler
Attorneys

UNITED STATES PATENT OFFICE.

WARREN W. JAQUES, OF LITTLE GENESEE, NEW YORK.

TRACE-HOOK.

SPECIFICATION forming part of Letters Patent No. 695,056, dated March 11, 1902.

Application filed December 4, 1901. Serial No. 84,703. (No model.)

*To all whom it may concern:*

Be it known that I, WARREN W. JAQUES, a citizen of the United States, residing at Little Genesee, in the county of Allegany, State of New York, have invented certain new and useful Improvements in Trace-Hooks; and I do hereby declare the following to be a full, clear, and exact description of the invention, such as will enable others skilled in the art to which it appertains to make and use the same.

The invention relates to trace-hooks; and it has for its object to provide a device of this nature which will effectively hold the trace from slipping therefrom when engaged properly therewith and to which the trace may be applied and from which it may be removed without difficulty, even when the trace end is stiff or is metal-faced, other objects and advantages of the invention being understood from the following desciption.

Figure 1:
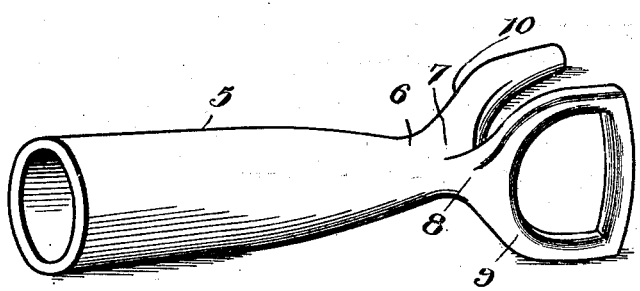
Figure 2:
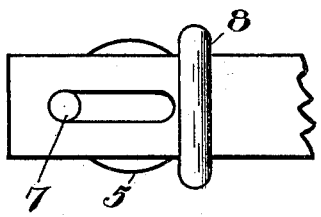
Figure 3:
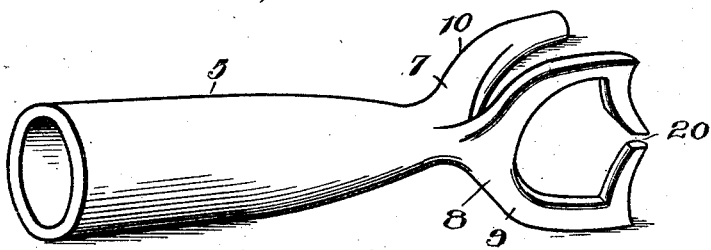
Figure 4:
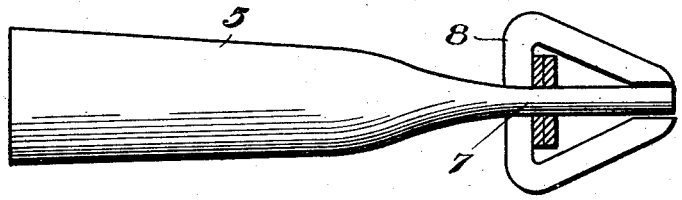

In the drawings forming a portion of this specification, and in which like numerals of reference indicate similar parts in the several views, Figure 1 is a perspective view showing one form of the trace-hook. Fig. 2 is a side elevation of the hook shown in Fig. 1 and showing a trace engaged therewith. Fig. 3 is a perspective view showing a second form of the invention. Fig. 4 is a rear elevation of a third form of the invention and showing a trace in section and illustrating the manner of engaging the trace with the hook.

Referring now to the drawings, and more particularly to Figs. 1 and 2 thereof, there is shown a track-hook comprising a stem portion 5, which may be hollow to receive the end of a singletree to permit of easy attachment, this stem being reduced gradually at its outer end to form the neck 6, from which spring the arms 7 and 8. The arm 8 has a portion 9 extending outwardly from the neck and an upper loop portion, as shown, the width of the opening of the loop being sufficient to permit of ready passage of the end of a trace therethrough, while in extension in a direction longitudinally of the stem said opening reaches to nearly the outer end of the arm. The arm 7 comprises also a portion 10, which extends outwardly from the stem and in a direction opposite to that of the portion 9, while the upper or outer portion of the arm extends slightly beyond the outer end of the arm 8 and diverges therefrom. The outer face of the portion 10 of the arm 7 lies at an acute angle to the axis of the stem, the entire arm 7 being rounded, as shown. In practice, as shown in Fig. 2 of the drawings, the end of the trace is passed through the loop of the arm 8, and the eye thereof is engaged with the arm 7, the trace end being pressed backwardly upon the arm and into contact with the slanting face of the portion 10 of the arm 7, so that as the trace is placed under strain if there is any slipping of it along the arm 7 it will be in the direction of the base of the arm, so that accidental displacement of the trace from the arm cannot take place.

In Fig. 3 of the drawings there is shown a construction which is the same as that shown in Fig. 1 of the drawings, with the exception that the upper side of the loop of the arm 8 has an opening 20 midway of its ends to permit of introduction of the trace by slipping it edgewise therethrough, the inner faces of the sides of the end of the loop being slanted to the opening to facilitate removal of the trace, as well as its application to the arm 7.

In Fig. 4 of the drawings there is shown a construction the same as that shown in Fig. 3, with the exception that the opening of the loop of the arm 8 is triangular, with its base directly adjacent to the stem of the hook and at right angles thereto, the apes being at the opening in the outer end or side of the loop. With this construction manipulation of the trace in its application to and removal from the arm 7 is facilitated, while when the trace is finally engaged with the arm 7, as indicated in dotted lines, it cannot come off, because of contacting with the sides of the triangular opening, this structure acting as an auxiliary to the specific shape of the arm 7, as above described, to prevent disengagement of the trace.

It will be understood that in practice other modifications may be made and that any suitable material may be used and proportions observed without departing from the spirit of the invention.

What is claimed is—

1. A trace-hook comprising a stem having laterally-offset arms, one of said arms having a triangular opening therethrough having its apex at the outer end of the arm and its base at right angles to the stem of the hook, and the other arm being adapted for passage through the eye of a trace.

2. A trace-hook comprising a stem having laterally-offset arms, one of said arms having an opening therethrough and having a passage through the outer side of the opening extending in a common plane with the axis of the stem of the hook to permit the insertion of the side edge of a trace for passage thereof into the opening of the arm, the second arm extending in the common plane of said passage and the axis of the stem and adapted for engagement through the eye of the trace.

3. A trace-hook comprising a stem having laterally-offset arms, one of said arms having a triangular opening therethrough having its apex at the outer end of the arm and its base at right angles to the stem of the hook, and the other arm being adapted for passage through the eye of the trace, the first-named arm having a passage formed at the apex of the triangular opening for passage of the trace into the opening.

In testimony whereof I affix my signature in presence of two witnesses.

WARREN W. JAQUES.

Witnesses:
GEO. H. PARKER,
A. W. ROOT.